United States Patent [19]
Burton

[11] 3,911,653
[45] Oct. 14, 1975

[54] MACHINE FOR HARVESTING FRUIT GROWN ON PLANTS ARRANGED IN A ROW

[75] Inventor: Charles G. Burton, Lewiston, N.Y.

[73] Assignee: Chisholm-Ryder Company, Inc., Niagara Falls, N.Y.

[22] Filed: Apr. 25, 1974

[21] Appl. No.: 463,965

Related U.S. Application Data

[63] Continuation of Ser. No. 242,716, April 10, 1972.

[52] U.S. Cl. .................................................. 56/330
[51] Int. Cl.² ......................................... A01D 46/00
[58] Field of Search ........ 56/330, 328 R, 327 R, 28, 56/29, 33

[56] References Cited
UNITED STATES PATENTS
3,439,482   4/1969   Orton.................................. 56/330
3,613,343   10/1971  Sagouspe et al...................... 56/330

*Primary Examiner*—Russell R. Kinsey
*Attorney, Agent, or Firm*—Sommer & Sommer

[57] ABSTRACT

A machine for harvesting fruit grown on plants arranged in a row including an improved picking arm in the form of a movable cantilever-mounted elongated member having a main portion extending rearwardly and inwardly relative to the longitudinal extent of the row of plants being harvested and also having a trailing free end portion which extends laterally relative to the longitudinal extent of the main portion, such main portion preferably being adjustable about its longitudinal axis so that the engagement of the arm with the plants can be arranged to produce efficient picking for the condition and variety of plant being harvested.

17 Claims, 14 Drawing Figures

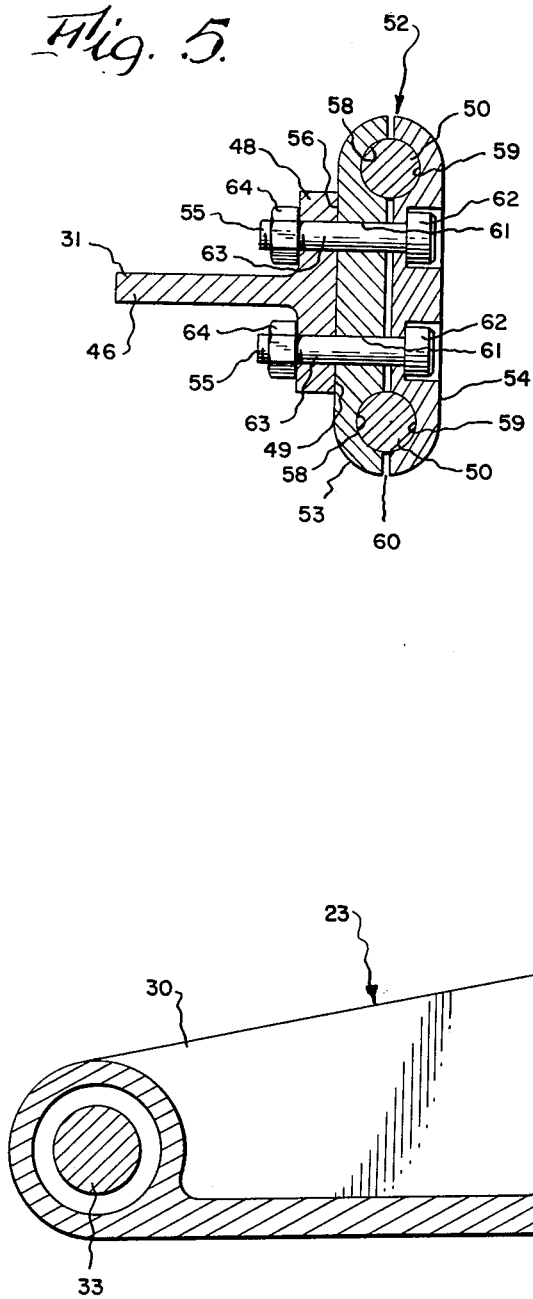
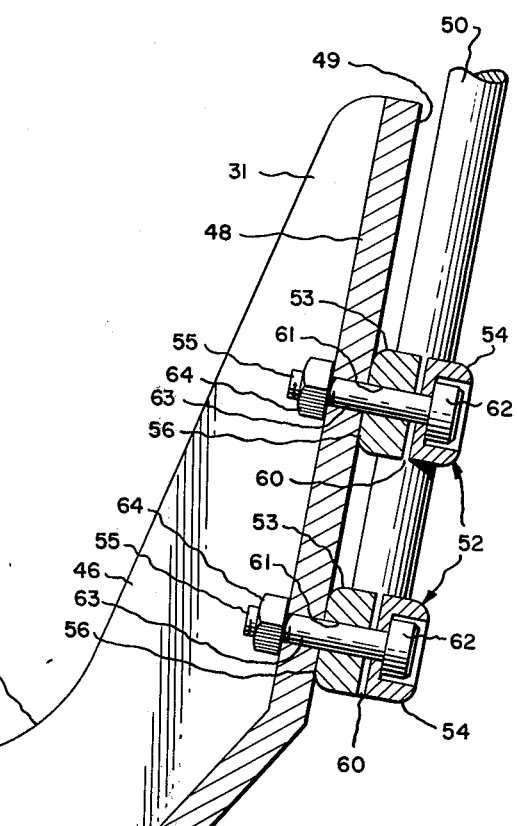

MACHINE FOR HARVESTING FRUIT GROWN ON PLANTS ARRANGED IN A ROW

This is a continuation of application Ser. No. 242,716 filed Apr. 10, 1972.

BACKGROUND OF THE INVENTION

It is known to provide a machine for mechanically harvesting fruit such as grapes which comprises a frame movable along a row of grape vines on which are mounted shaker bars having a sliding contact with the vines on one or both sides of the row and movable back and forth transversely of the row so as to dislodge the grapes which are then suitably collected. Such a grape harvester is shown in Orton Pat. No. 3,439,482, for example.

With such prior art type of grape harvester, the grapes are removed from the vines principally as individual berries rather than as clusters. Sometimes the pedicel is removed from the individual grape berry during harvesting which leaves the berry with an opening through which juice can be lost prior to processing and which also allows accelerated deterioration of the berry to occur. Furthermore, not all conditions and varieties of grapevines are harvested with the same facility using such a prior art type of grape harvester, even though the degree of agitation of the vine might be varied by adjusting the frequency and amplitude of the vine-shaking instrumentalities of the harvester.

SUMMARY OF THE INVENTION

The present invention relates to an improved machine for mechanically harvesting fruit such as grapes grown on plants arranged in a row.

An important object of the present invention is to provide an improved grape harvester which removes grapes with greater picking efficiency in the respects of reduced grape damage, reduced machine power and increased ground speed.

More specifically, another important object of the present invention is to provide an improved grape harvester which removes more grapes in clusters than as individual berries.

Another important specific object of the present invention is to provide an improved grape harvester which is adapted to pick a wide variety of grapes and under different conditions of the vines.

Other objects and advantages of the present invention will be apparent from the following detailed description of a preferred embodiment illustrated in the accompanying drawings.

DESCRIPTION OF DRAWINGS

FIG. 4 is a fragmentary horizontal section view thereof, taken on line 4—4 of FIG. 3.

FIG. 5 is an enlarged vertical sectional view of one picking arm assembly, taken on line 5—5 of FIG. 1, and showing the means for adjustably mounting a pair of picking rods on their support member.

DESCRIPTION OF PREFERRED EMBODIMENT

Figure 1:
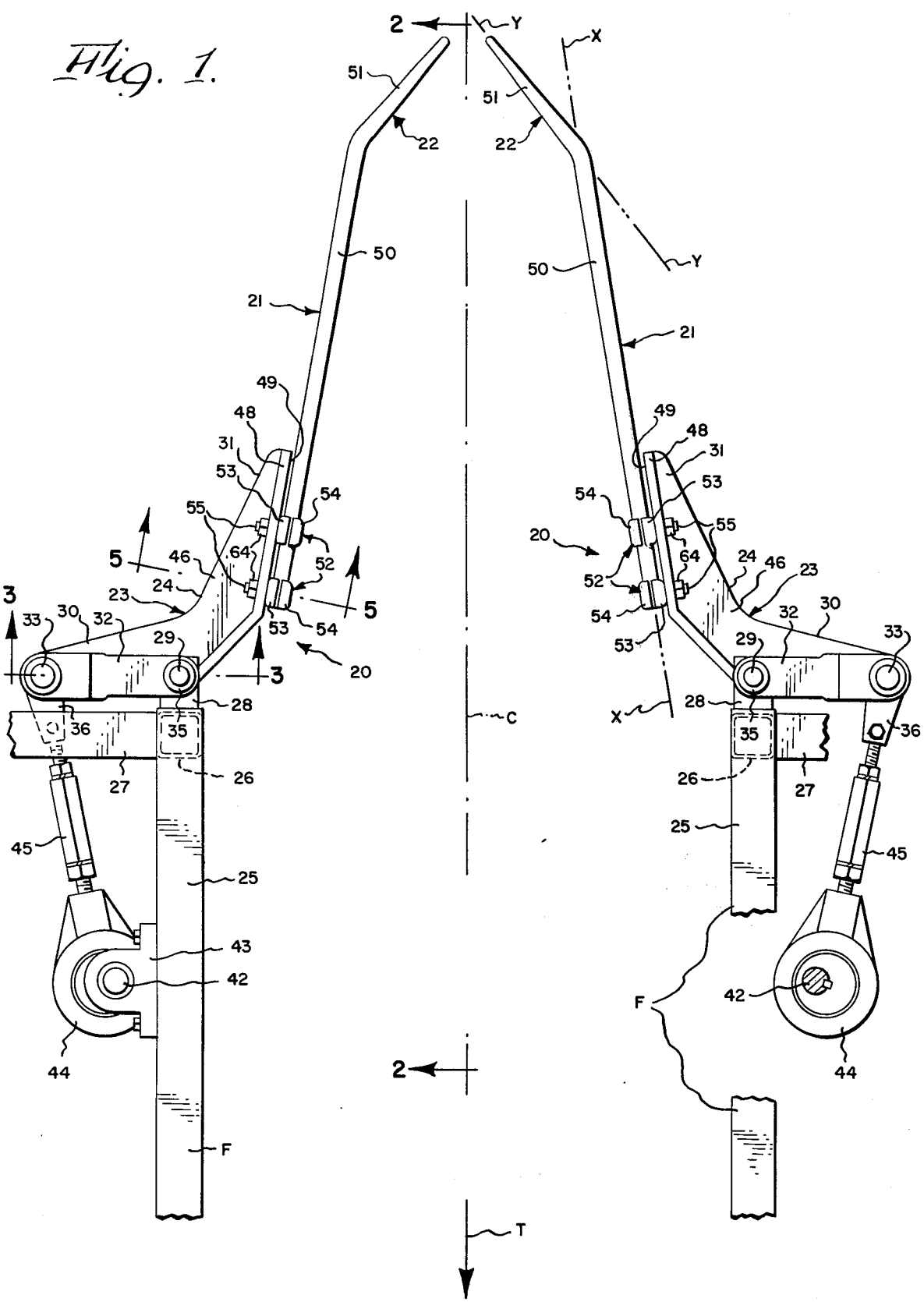
FIG. 1 is a top plan view of a pair of opposed produce picking arm assemblies, each constructed according to the present invention, movably arranged on the frame, fragmentarily illustrated, of a harvesting machine movable alongside plants bearing produce to be harvested, such arms being disposed on opposite sides of the plants and arranged on said frame for movement back and forth transversely of the plants.

Referring to FIG. 1, C represents the centerline of a row of plants bearing fruit to be harvested such as a row of grapevines. The machine forming the subject of the present invention travels in the direction of the arrow T shown in FIG. 1 and is adapted to harvest or pick fruit from the plants, having a mobile frame F which straddles the row of plants which includes a portion on opposite sides of centerline C on which a plurality of vertically spaced fruit picking arm assemblies embodying the present invention, severally represented generally by the numeral 20, are movably arranged. Only the upper assembly is illustrated on each side of the row. Inasmuch as the picking arm assemblies on opposite sides of the row of plants are similar in construction, only one such assembly on one side of the row will be described in detail, it being intended that such description will apply equally to the similar assembly on the opposite side of the row.

The fruit picking means 20 is movably arranged on frame F and is shown as including rearwardly extending arm means 21, finger means 22 on the trailing end of said arm means, and means 23 including an arm support member 24 for moving said arm means back and forth transversely of the row of plants.

Frame F on each side of centerline C which may also be considered the centerline of the machine may be of any suitable construction and is shown as including a horizontal upper member 25 extending fore and aft of the machine at the rear end of which is a vertical member 26 and the juncture of these two members is also joined by a horizontal transversely extending member 27. The members 25-27 may be joined together in any suitable manner as by welding.

Figure 2:
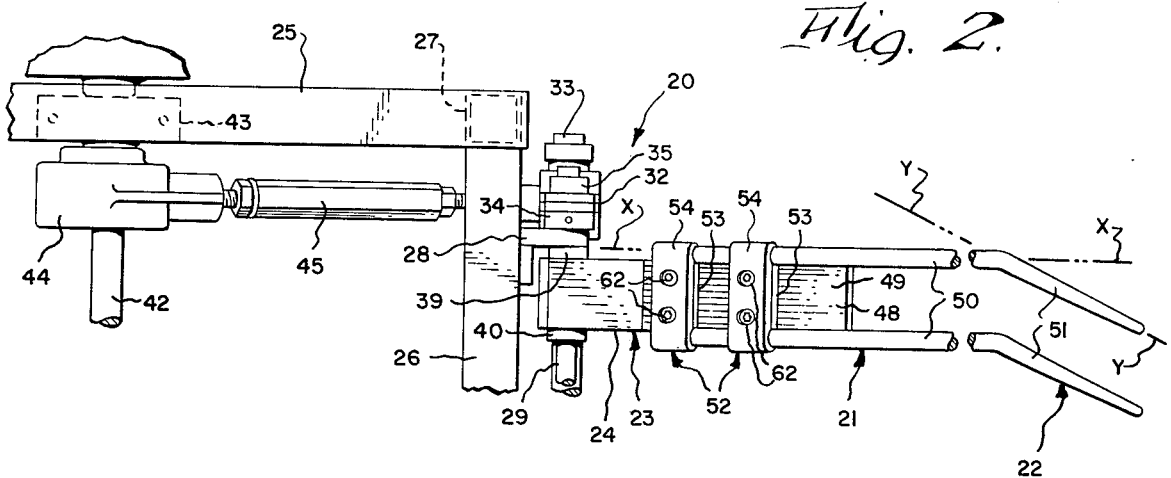
FIG. 2 is a fragmentary vertical sectional view of the machine taken on line 2—2 of FIG. 1, and showing the appearance of the operative inner face of a picking arm assembly as viewed from the centerline of the machine looking horizontally laterally outwardly.
Figure 3:
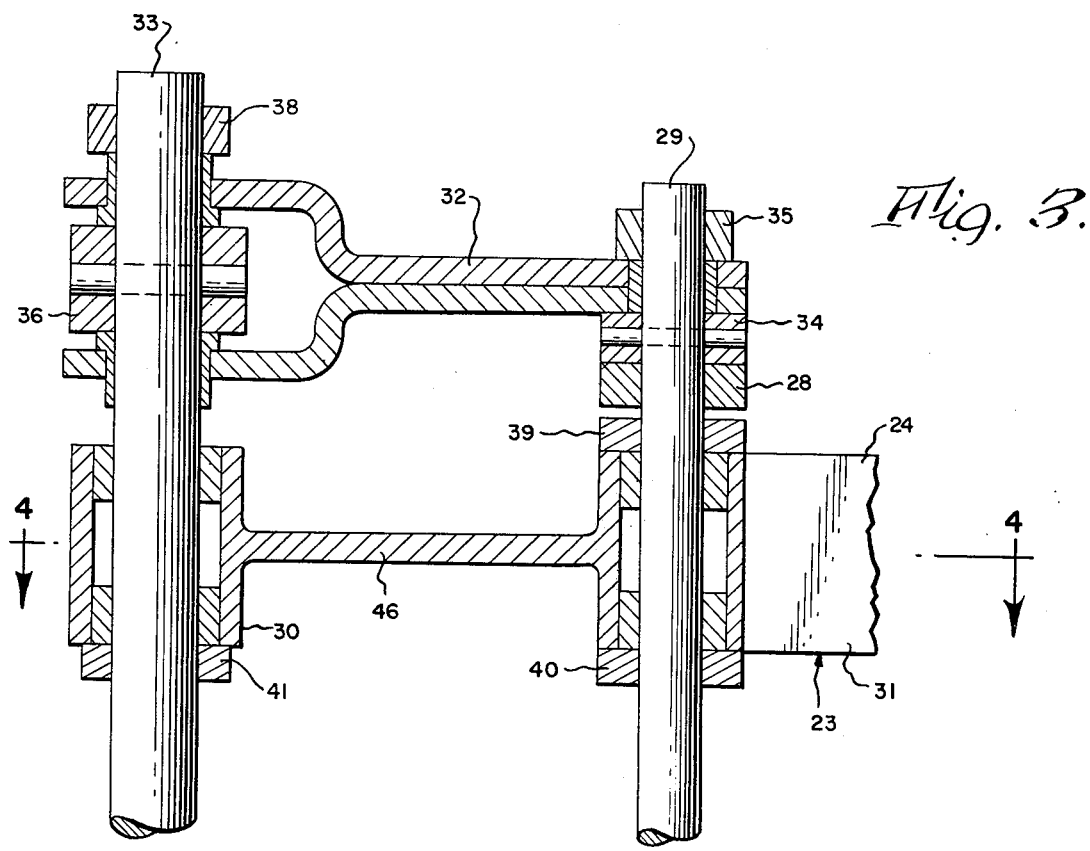
FIG. 3 is an enlarged fragmentary transverse sectional view through the mounting of one picking arm assembly on the machine frame, taken on line 3—3 of FIG. 1.

Extending rearwardly from vertical frame member 27 and suitably joined thereto as by welding is a pair of vertically spaced lugs, only the upper one 28 of which shows in FIGS. 1–3. These lugs are suitably apertured to receive an elongated vertical pivot pin 29. Support member 24 which is in the form of a bellcrank lever is suitably journaled intermediate its ends on pivot pin 29. This bellcrank member includes a lateral arm section 30 which extends horizontally outwardly from pivot pin 29 and a fore and aft section 31 which extends from this pin generally rearwardly and inwardly with respect to the machine travel line T.

While means for oscillating bellcrank lever 24 may be variously constructed, the same is shown as comprising a pair of vertically spaced horizontal links extending laterally outwardly from pivot pin 29, only the upper one 32 of which shows in FIG. 1. The outer ends of these links carry on elongated vertical pivot pin 33. The opposite ends of these links such as upper one 32 are suitably journaled on pivot pins 29 and 33. The outer end of the lateral arm section 30 of the bellcrank lever is suitably journaled on this pivot pin 33.

As best shown in FIG. 3, the right or inner end of link 32 is vertically apertured and bushed to rest on a collar 34 pinned to pivot pin 29. This collar in turn rests on the upper surface of frame lug 28. Link 32 is retained on collar 34 by an upper collar 35 on pivot pin 29. The left or outer end of link 32 is shown as bifurcated, vertically apertured and bushed to receive pivot pin 33 and straddles a collar 36 pinned to this pivot pin. An upper collar 38 on pivot pin 33 retains link 32 thereon.

Still referring to FIG. 3, the juncture of sections 30 and 31 of bellcrank lever 24 is vertically apertured and bushed to receive pivot pin 29. Under and lower collars 39 and 40, respectively, retain lever 24 on pivot pin 29. The outer end of section 30 of lever 24 is similarly vertically apertured and bushed to receive pivot pin 33 and a lower collar 41 supports the outer end of this section on this pin.

An elongated vertical drive shaft 42 is journaled at opposite ends in upper and lower bearing pillow blocks mounted on frame F, only the upper one 43 of which is illustrated and then on the left hand side of the machine as viewed in FIG. 1. Block 43 is there shown as being suitably mounted on frame member 25. Crank and connecting rod means connect drive shaft 42 to pivot pin 33. This is shown as provided by a commercially available eccentric mechanism 44 operatively connected to the drive shaft and suitably connected by an adjustable link 45 to collar 36 which is fast on pivot pin 33. It will thus be seen that rotation of drive shaft 42 by suitable motor means (not shown) will cause bellcrank lever 24 to oscillate about the vertical axis of pivot pin 29.

Bellcrank lever 24 is shown as constructed as an integral member including a horizontal rib 46 outstanding from a vertical plate 48. This plate along the arm section 31 has an inner flat vertical face 49 adjacent its rear end.

Arm means 21 is shown as comprising a pair of vertically spaced horizontal arm bars 50 each in the form of an elongated cylindrical rod having a central longitudinal axis X—X.

Finger means 22 is shown as comprising a pair of finger bars 51 severally rigidly connected to the trailing or rear ends of arm bars 50 and extending laterally therefrom. Each finger bar 51 is shown as being in the form of a conically tapered rod having a central longitudinal axis Y—Y with its thicker end arranged adjacent its supporting arm bar and its thinner end being its tip. The finger bar may be integral with its arm bar or separate therefrom but suitably rigidly joined thereto. The arm and finger bars may be made of any suitable material, and are preferably made of fiberglass.

The front ends of arm bars 50 are cantilever-mounted on the section 31 of bellcrank lever 24 by a pair of horizontally spaced similar clamp assemblies 52, best shown in FIGS. 4 and 5. As there shown each clamp assembly 52 includes an inner clamp bracket 53, an outer clamp bracket 54, and a pair of fasteners 55. Bracket 53 on one side has a flat vertical face 56 which engages face 49 on the bellcrank lever. The opposite vertical face of bracket 53 has a pair of horizontal semicylindrical recesses 58 severally opposed by similar semicylindrical recesses 59 provided in the inner vertical face of outer bracket 54. The front end portions of arm bars 50 are arranged in recesses 58 and 59 and when brackets 53 and 54 are drawn together the opposing faces of these brackets are spaced apart slightly as indicated at 60.

Brackets 53 and 54 and the lever plate 48 above and below rib 46 are provided with a pair of vertically spaced aligned apertures, each set being collectively indicated at 61. Each of the openings in outer clamp bracket 54 is counterbored to receive the head 62 of fastener 55 in the form of a bolt having an externally threaded shank 63 which extends through the aligned openings. A nut 64 is threadedly arranged on the exposed end of the shank 63 and bears against the outside face of plate 48.

It will be noted that the general longitudinal extent of arm bars 50 is rearwardly and inwardly inclined relative to centerline C. By loosening nuts 64 fastening the various arm bars to their respective support members or bellcrank levers 24, each of these arm bars can be rotated about its longitudinal axis X—X so as to vary the disposition of the angled finger bar free end portion 51 relative to the plants in the row, following which nuts 64 are retightened. This adjustment is desirable to provide a desired contact and interaction between these arms and the plants, as will now be explained.

Figure 6:
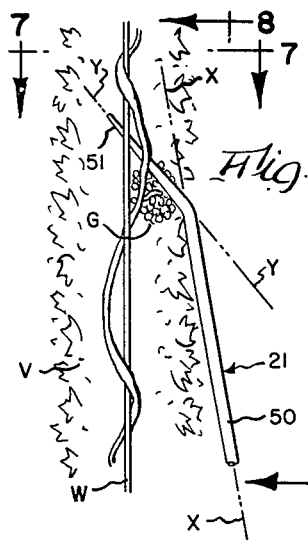
FIG. 6 is a fragmentary top plan view of a picking arm assembly illustrated in operative association with a grapevine, and showing the angled finger bar on the trailing end of the arm in one disposition relative to the grapevine to depict a typical position when harvesting a moderately difficult to pick variety of grape.
Figure 7:
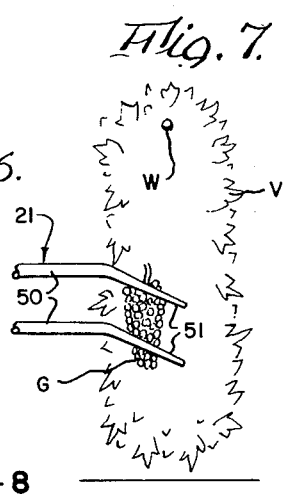
FIG. 7 is a transverse sectional view thereof, taken on line 7—7 of FIG. 6, and showing fragmentarily a rear end view of the picking arm assembly.
Figure 8:
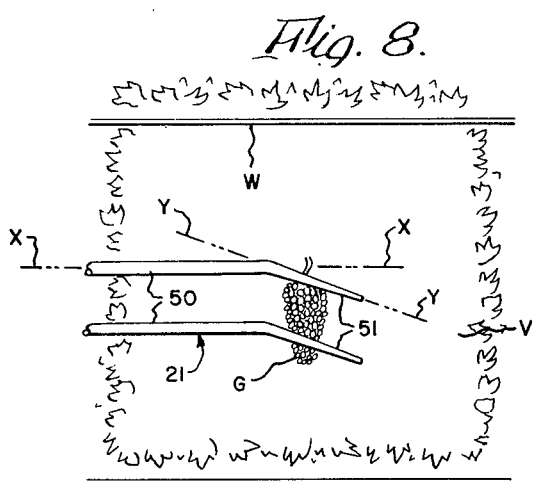
FIG. 8 is a view thereof, taken on line 8—8 of FIG. 6, and showing fragmentarily a side elevational view of the picking arm assembly.

Referring to FIGS. 6–8, it will be seen that the vine V is depicted as supported on a cordon wire W, below which the foliage of the vine has canes supporting clusters of grapes one of which is depicted at G. In the disposition of the finger bar rear end portions 51 of the picking arms 21 shown in FIGS. 6–8, these finger bars incline inwardly away from the front main portions 50 of the arms toward the center of the row as well as downwardly relative to the ground. Such a disposition of these fingers provides a deep penetration into the grape foliage. As the harvesting machine moves along the row, these fingers or finger bars have a stripping action to strip off whole bunches or fragments of grape clusters, this occurring while the picking arms are being moved back and forth transversely of the row of vines. In this disposition of the finger bars, it will be noted that as viewed from above (FIG. 6) these finger bars extend laterally relative to the picking arms so as to have a profile in a horizontal plane. More specifically, as viewed from above, the axis Y—Y of the finger bar 51 is at a greater included angle with respect to the centerline of the row of vines than the longitudinal axis X—X of the main portion 50 of the picking arm. As viewed from the side, such as depicted in FIG. 8, the axis Y—Y of each finger bar 51 is also at an angle and extends laterally with respect to the horizontal longitudinal axis of the main portion of the picking arm so that the finger bar has a profile in a vertical plane.

Figure 9:
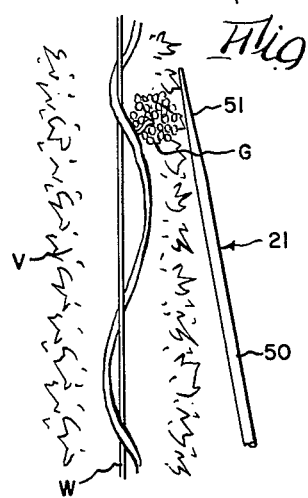
FIGS. 9, 10 and 11 are another sequence of views similar to those of FIGS. 6-8, but showing the angled finger bar in another disposition relative to the grapevine to depict a typical position when harvesting an easy to pick variety of grape.
Figure 10:
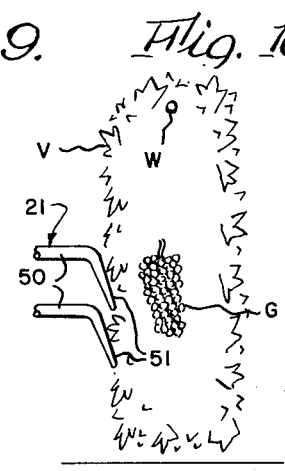
Figure 11:
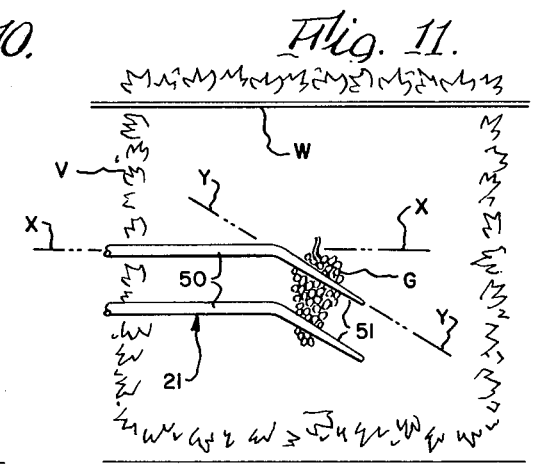

If a more easy to pick variety of grapes is being harvested, the finger bars can have the disposition depicted in FIGS. 9–11. As there shown, the longitudinal axis Y—Y of the finger bar 51 lies in a vertical plane which is substantially coincident with a vertical plane in which the longitudinal axis X—X of the main portion 50 of the picking arm lies. Consequently, the axis of the finger bar Y—Y extends downwardly toward the ground at a stepper angle, as viewed from the side (FIG. 11), than the disposition of the finger bar in FIG. 8. The disposition shown in FIG. 11 will give a greater surface coverage of vine in a vertical plane, whereas the inward extension of the finger bars as depicted in FIG. 8 will tend toward a maximum inward penetration of the foliage.

Figure 12:
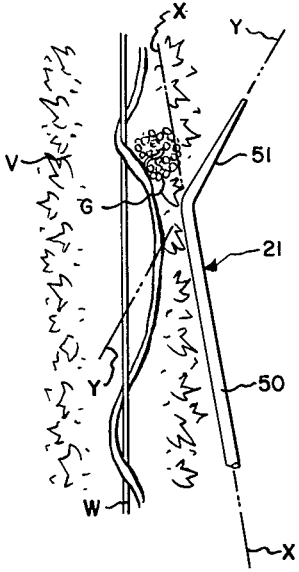
FIGS. 12, 13 and 14 constitute still another sequence of views similar to those of FIGS. 6-8 and FIGS. 9-11, but showing the angled finger bar in still another disposition relative to the grapevine to depict a typical position when harvesting an extremely easy to pick variety of grape.
Figure 13:
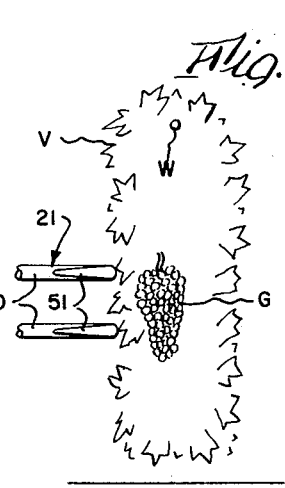
Figure 14:
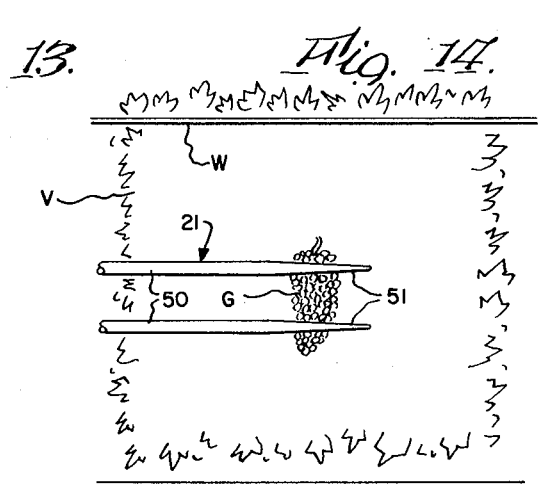

If an extremely easy to pick variety of grape is being harvested, the finger bar 51 at the end of the picking arm 50 can have the disposition relative to the grape vine depicted in FIGS. 12–14. As there shown, the axis Y—Y of the finger bar lies in a horizontal plane and has its tip pointing outwardly away from the center of the vine. Such disposition reduced the physical attack to the outside leaf area and the canes of the vine. Also, there is reduced abrasion on the picking arm, vine trunk, stakes and end posts.

The improved picking arm construction of the present invention has the advantage of being easily adjusted or positioned to accomplish several functional purposes. In the disposition shown in FIGS. 6–8, deep penetration of the vine foliage is obtained as viewed from above, and there is a broad area of contact with the vine as viewed from the side. The penetration not only reaches the grapes at the center of the vine curtain but also produces a stripping action of the grape clusters. The broad side area of contact with the vine as the arm is moved back and forth transversely or the vine causes effective agitation of the vine to dislodge grapes as well as to strip them. In the disposition shown in FIGS. 9–11, there is a lesser penetration of the foliage as viewed from above but a broader area contact as viewed from the side. As to the disposition depicted in FIGS. 12–14, there is no penetration by the finger bar extremity as viewed from above and a minimum area contact with the vine foliage is produced as viewed from the side. Because of all the different varieties of grapes and their differences in physical characteristics, this adjustability can be used to advantage.

The finger bar end portion 51 facilitates penetration into the curtain of grapes to attach those grapes that are sandwiched between the vine leaves and may be difficult to remove. Also, the finger bar end portion facilitates penetration into the grapes that are not sandwiched between vine leaves and otherwise are difficult to remove.

By angling in the vertical plane the finger bar end portion 51, physical contact with the leaf curtain is facilitated and the grapes in the entire area between the picking bars is covered instead of merely a horizontal line along the line of each picking bar.

Moreover, the penetrating finger bar end portion 51 being at the outboard end of the picking arm 50 and therefore where such arm has its maximum flexibility has an advantage of working on the cane and stripping entire clusters of grapes or bunches. The angle of the finger bar end portion in the horizontal plane produces a scissoring action to strip off entire clusters of grapes.

The construction of picking arm assembly illustrated and described as the preferred embodiment of the invention has been tried on a wide variety of easy to pick and difficult to pick varieties of grapes and has been found to be highly successful in efficiently picking the grapes while minimizing damage to the grapes and also to the vines.

It is not intended to limit the use of the machine of the present invention to the harvesting of grapes, but the harvesting of produce including other fruits and even vegetables is contemplated if grown on plants, preferably arranged in a row, suitable for harvesting by the machine as defined in the appended claims.

Thus one aspect of the present invention provides, in a machine for harvesting produce grown on plants arranged in a row and having a frame movable forwardly along said row, a plurality of elongated vertically-spaced plant-engaging produce-harvesting means arranged on said frame for harvesting movement back and forth transversely of the line of forward movement of said frame, characterized by said means constantly extending rearwardly and, except in the case of the arrangement shown in FIGS. 12–14, included at an angle to either a horizontal plane or a vertical plane, or both, during said harvesting movement.

What is claimed is:

1. In a machine for harvesting produce grown on plants arranged in a row and having a frame movable forwardly along said row, produce picking means arranged on said frame for movement back and forth transversely of said row including constantly rearwardly extending arm bar means engageable with the plants and mens for moving said arm bar means back and forth transversely of the row, wherein the improvement comprises finger means on the trailing end of said arm bar means and extending laterally therefrom.

2. A machine according to claim 1 wherein the lateral extension of said finger means relative to said arm bar means has a profile in a horizontal plane.

3. A machine according to claim 1 wherein the lateral extension of said finger means relative to said arm bar means has a profile in a vertical plane.

4. A machine according to claim 1 wherein the lateral extension of said finger means relative to said arm bar means has profiles in both horizontal and vertical planes.

5. A machine according to claim 1 wherein said arm bar means comprises a cantilever-mounted arm bar having a longitudinal axis, and said finger means comprises a finger bar having a longitudinal axis arranged at an angle to said longitudinal axis of said arm bar.

6. A machine according to claim 5 wherein said longitudinal axis of said finger bar lies in a vertical plane inclined to another vertical plane in which said longitudinal axis of said arm bar lies.

7. A machine according to claim 6 wherein said arm bar inclines inwardly relative to said row, said finger bar inclines at a greater included angle relative to said row than said arm bar, and the tip of said finger bar points inwardly relative to the plants.

8. A maching according to claim 5 wherein said longitudinal axis of said finger bar lies in a vertical plane which is substantially coincident with another vertical plane in which said longitudinal axis of said arm bar lies.

9. A machine according to claim 5 wherein the cantilever-mounting of said arm bar permits the same to be adjusted selectively about its said longitudinal axis whereby the disposition of said finger bar may be varied relative to the plants.

10. A machine according to claim 1 wherein said moving means includes an oscillatable lever, and said arm bar means comprises a pair of arm bars severally cantilever-mounted at their forward ends on said lever.

11. A machine according to claim 10 wherein each of said arm bars has a longitudinal axis, said finger means comprises a finger bar for each of said arm bars and angled with respect thereto, and the mounting of said arm bars on said lever permitting each of said arm bars to be adjusted selectively about its said longitudinal axis whereby the disposition of its said finger bar may be varied relative to the plants.

12. In a machine for harvesting produce grown on plants arranged in a row and having a frame movable forwardly along said row and a plurality of elongated vertically-spaced plant-engaging produce-harvesting means arranged on said frame constantly to extend rearwardly and for harvesting movement back and forth transversely of the line of forward movement of said frame, wherein the improvement comprises said means being inclined at an angle to a horizontal plane during harvesting movement.

13. A machine according to claim 12 wherein the inclination of said means is adjustable.

14. A machine according to claim 12 wherein said means are also inclined at an angle to a vertical plane during said harvesting movement.

15. A machine according to claim 14 wherein the inclination of said means is adjustable.

16. In a machine for harvesting produce grown on plants arranged in a row and having a frame movable forwardly along said row and a plurality of elongated vertically-spaced plant-engaging produce-harvesting means arranged on said frame constantly to extend rearwardly and for harvesting movement back and forth transversely of the line of forward movement of said frame, wherein the improvement comprises said means being inclined at an angle to a vertical plane during said harvesting movement.

17. A machine according to claim 16 wherein the inclination of said means is adjustable.

* * * * *